United States Patent Office 3,155,618
Patented Nov. 3, 1964

3,155,618
LUBRICANT
David B. Cox, Lynbrook, N.Y., assignor to Socony Mobil Oil Company, Inc., a corporation of New York
No Drawing. Filed Apr. 5, 1960, Ser. No. 20,033
17 Claims. (Cl. 252—39)

This invention has to do with new lubricants, particularly grease compositions, resistant to damage caused by exposure to atomic radiation, and high energy radiation produced by other sources, such as electron or proton particle accelerators, X-ray machines, ultra-violet lamps, and the like.

With the accelerating development in recent years of atomic energy sources and equipment for producing and utilizing such energy, there has resulted a corresponding demand for lubricants capable of resisting atomic radiation. It has been established that organic compounds such as those in lubricating oils are damaged by nuclear particles. Bonds or linkages of organic compounds are broken and fragments of the broken molecules combine to form compounds different from the original compound or compounds. Many of the newly formed compounds have greater viscosity (due to polymerization) than the original compound or compounds, eventually causing a failure of the lubricant and damage to the equipment.

For example, atomic power plants require pumps, control rod mechanisms, fuel handling mechanisms, compressors, turbines and related machinery, all of which require lubrication, and all of which are exposed to atomic radiation. Shielding of such equipment can be effective to some extent, but stray radiations may still persist in sufficient intensity to present lubrication problems. Correspondingly, atomic warfare machinery such as military vehicles and guns, and nuclear-powered space vehicles such as atomic-powered space craft, and the like, undoubtedly will be exposed to radiation. If the effects of radiation in the lubrication thereof are not controlled, such machinery would be in danger of becoming immobilized or, at least, having impaired operability; in the extreme case, the machinery would be inoperable.

Lubricating oils, mineral and synthetic, have been found to be capable of withstanding atomic radiation of the order of $10^7$ rads, but undergo substantial deterioration at $10^8$ rads and greater. Viscosity increase is noticeable; so too are increases in gas evolution, acidity, foam formation, and carbonization. All of these are undesirable in lubrication of equipment. It has also been found that aromatic compounds or compounds containing aromatic groups are more resistant to atomic radiation than are compounds free from aromatic groups. This has given rise to a generalization that both the oil vehicle and the gelling agent of a grease should be aromatic or contain aromatic groups.

To date it has been found that conventional greases formed from mineral oils and soaps such as lithium stearate, deteriorate when exposed to atomic radiation of about $1 \times 10^8$ rads. Substantial increase in viscosity occurs as evidence of polymerization of the mineral oil. At the same time, the thickener or gelling agent structure is damaged as evidenced by softening of the grease; in some cases, the grease may even become fluid. In other cases where a grease is statically irradiated, the grease may not visually appear to be damaged, but will break down badly when subjected to shear and will be deteriorated in other performance characteristics. With increased radiation dosage, as explained hereinafter, the grease gels; this indicates a polymerization of the mineral oil and/or thickener.

As used herein, radiation dosage means the amount of energy from atomic radiation absorbed by a material. The unit "rad" represents the absorption of 100 ergs of energy per gram of material (any material) from radiation particles. As an approximation, one rad is equivalent to 1.2 roentgens.

It has now been found that lubricants capable of withstanding atomic radiation of about $1 \times 10^9$ rads without undue damage, are formed by combining an aromatic fluid of lubricating viscosity and a complex metal salt-metal soap free of aromatic substituents. In this connection, it has been found that superior greases so resistant to atomic radiation comprise such a fluid and a grease-forming quantity of a grease-gelling salt free of aromatic substituents.

As indicated, the gelling agents of this invention are salts free from aromatic substituents or components. The term "salts" is used herein in a generic sense and is inclusive of the term "soaps." While salts (and soaps) of alkaline earth metals and other metals such as aluminum, are contemplated, outstanding performance has been realized with complexes of alkaline earth metals.

Representative salt and salt-soap complexes are calcium stearate-acetate as disclosed in Patent No. 2,197,263, and barium stearate-acetate as disclosed in Patent No. 2,564,561. Others include calcium stearate-caprylate-acetate complexes described by Liddy in application Serial No. 505,063, filed April 29, 1955 which has been abandoned in favor of application Serial No. 67,499, filed November 7, 1960 and now Patent No. 2,999,065, issued September 5, 1961; and calcium caprylate-acetate described by Liddy in application U.S. Serial No. 510,863, filed May 24, 1955 which has been abandoned in favor of application Serial No. 78,842, filed December 28, 1960 and now Patent No. 2,999,066, issued September 5, 1961. Still others are calcium salts and soaps of low-, intermediate- and high-molecular weight acids and of nut oil acids, as described by Schott in application U.S. Serial No. 829,465, filed July 24, 1959, now abandoned. It is to be understood that all of the acids mentioned in the said applications and patents can be used herein. In this connection, a high molecular weight acid is one having 13 or more carbon atoms per molecule; an intermediate molecular weight acid is one having from about 7 to about 12 carbon atoms per molecule; and a low molecular weight acid has from 1 to about 6 carbon atoms per molecule. Reference is made to said applications and patents for details in the method of their preparation and relative balance of metals and acids used in their preparation.

Nonetheless, although complex soap gelling agents free from aromatic substituents are broadly included within this invention, exceptional results have been obtained with calcium stearate-caprylate-acetate complexes as defined in Liddy application Serial No. 505,063, which has been abandoned in favor of application Serial No. 67,499, filed November 7, 1960, and now Patent No. 2,999,065, issued September 5, 1961, mentioned above.

The lubricants and greases of this invention contain, together with the aforesaid salts and for soaps, an aromatic fluid of lubricating viscosity. In general, this embraces fluids having a viscosity (S.U.V.) of at least about 40 seconds at 100° F., and particularly those within the range of about 60 seconds to about 6000 seconds at 100° F. The aromatic fluids contain mono- or polyaryl radicals such as phenyl, phenylene, naphthyl, biphenyl, anthryl and the like. The aromatic fluids can be hydrocarbons, such as alkyl benzenes, alkyl biphenyls, diphenyl alkanes, alkyl styrene polymers, etc. Other aromatic fluids are ethers, particularly diphenyl ethers. Particularly advantageous are alkyl-substituted diphenyl ethers typified by polydodecyl diphenyl ether, and a butyl-substituted bis-(p-phenoxyphenyl) ether, and members of the polyphenyl ether series such as, for example, m-bis (m-phenoxyphenoxy) benzene.

Illustrative of the greases contemplated herein are those described below in Examples 1 and 2.

EXAMPLE 1

The following quantities, all parts by weight, were used:

| | |
|---|---|
| Lime flour (69.8% wt., of CaO) | 102.2 |
| Acetic acid | 106.6 |
| Water | 10 |
| Hydrogenated tallow fatty acids (predominantly stearic acid) | 17.1 |
| Caprylic acid | 64.2 |
| Polydodecyl diphenyl ether [1] | 1110 |

[1] The polydodecyl diphenyl ether used herein as an aromatic fluid has the following properties and corresponds to a mixture of polydodecyl diphenyl ethers:

| | |
|---|---|
| Boiling range, °C. | Minimum 287° C. @ 0.7 mm. Hg. |
| Viscosity (S.U.V.) at 100° F. | 794. |
| Viscosity (S.U.V.) at 210° F. | 83. |

All of the polydodecyl diphenyl ether, the acids, water and 98 parts of lime flour, were added to a grease kettle. The kettle was equipped with electric heaters and with motor-driven paddles which were in motion throughout the preparation. The mixture in the kettle was heated slowly to 350° F. during a period of about 2½ hours. No grease structure was formed, even when the mixture was heated further to 400° F. during an additional ½ hour.

The mixture was cooled to about 70° F. and allowed to stand overnight. The following day, it was heated to 350° F. during 2 hours. Dry lime flour, 4.4 parts, was added and the resulting mixture was heated to 450° F. during 2 hours. Additional heat was applied to maintain the latter mixture between 450 and 480° F.; after 30 minutes, grease structure developed. The grease was maintained at 450–480° F. for another 30 minutes. It was then cooled to about 180–200° F. and milled in a 3-roll ink mill.

The grease so formed had the following properties:

| | |
|---|---|
| ½ scale penetration, worked/unworked | 112/139 |
| Four ball wear test, 1 hr. @ 300° F., 40 kg. load, 600 r.p.m. mm | 0.48 |

The mixed ethers were prepared by a Friedel-Crafts alkylation of diphenyl ether with 1-dodecene in the presence of AlCl₃ catalyst. The reaction product was stripped to the overhead boiling point given above.

EXAMPLE 2

The following quantities, all parts by weight, were used:

| | |
|---|---|
| Lime flour (69.8 wt. percent, CaO) | 72 |
| Acetic acid | 68.5 |
| Water | 10 |
| Oleic acid | 84.7 |
| Caprylic acid | 71.7 |
| Polydodecyl diphenyl ether (Ex. 1) | 600 |
| Butylated bis (p-phenoxyphenyl) ether [1] | 600 |

[1] The butylated bis-(p-phenoxyphenyl) ether is an oil having an approximate molecular weight of 460. Thus, this corresponds to an ether having two tertiary butyl substituents of the following structure:

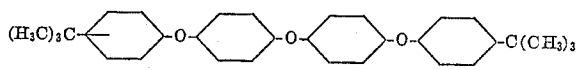

Other properties include:

| | |
|---|---|
| Pour point | 65° F. |
| Boiling point | 482–575° F. @ 0.25 mm. Hg. |
| Viscosity, centistokes | 13,660 at 100° F.; 34.4 at 210° F.; 3.08 at 400° F. |
| Flash point | 545° F. |
| Fire point | 622° F. |

The kettle used was the same as that used in Example 1. Polydodecyl diphenyl ether (600 parts), all of the acids, water and 70 parts of lime, were added to the kettle. The mixture was heated to 350° F. during a period of about 2 hours. Butylated bis-(p-phenoxyphenyl) ether, 600 parts, was then added and the resulting mixture was heated to 480° F. Additional lime flour (2 parts) was added and a temperature of 480° F. was continued for about 1 hour. The product was then cooled to 120° F. and was milled in a 3-roll ink mill (as described in Example 1). Since the product was heavy, it was cut back with additional oil in order to yield a softer product. To 200 parts of the heavy product was added 31 parts of a mixture of equal parts of the polydodecyl diphenyl ether and of the butylated bis-(p-phenoxyphenyl) ether. The resulting product was worked with a spatula while heated to about 300° F., and was further worked in the same manner at the same temperature. It was then ink milled and again further worked with a spatula at 300° F.

The product has a ½ scale penetration, unworked/worked, of 141/151.

The ether is prepared by alkylating bis-(p-phenoxyphenyl) ether with isobutylene at 0–10° C. for 5 hours, in the presence of small amounts of concentrated sulfuric acid and boron trifluoride. After separation of an acid layer, the reaction product was mixed with an aqueous potassium hydroxide solution and the aqueous layer which formed was separated. The product was washed with water and then dried. On distillation, the desired butylated product had a boiling range of 250–300° C. at 0.25 mm.

The effectiveness of the greases of Examples 1 and 2 in withstanding atomic radiation is shown by the results of tests in the Brookhaven pile. This pile is graphite-moderated and air-cooled. Irradiation was carried out in hole number W-24 which has additional water cooling for the samples. Dosage used with these greases was $3.2 \times 10^{18}$ nvt (thermal), which is equivalent to about $2-3 \times 10^9$ rads. The test involves packing 30 grams of grease in a 100 ml. polyethylene container and exposing the same to the specified dosage. At the end of the test, each grease appeared to be unchanged. Surface irregularities showed that the greases had never been fluid. There was no sign of gas bubble formation.

Dynamic Tests

The grease of Example 1 was also tested for bearing performance in a test, which is described in Coordinating Research Council Incorporated, Test Method L-35. This involves the use of a 204 ball bearing running at 10,000 r.p.m. Parallel tests are run on irradiated and non-irradiated bearings. In this case, the L-35 test method was modified in that the bearing ran continuously. The test temperature was 350° F. The irradiated grease was given a dosage of $1 \times 10^8$ rads (cobalt 60 gammas) statically before being packed in the bearing. Then the test was run with further radiation at the rate of $2.85 \times 10^5$ rads per hour. The test was arbitrarily stopped at 500 hours (total dosage $2.24 \times 10^8$ rads) with the bearing and grease still performing properly. The non-irradiated test was also stopped at 500 hours, with the grease still performing properly.

The grease of Example 2 was subjected to the same test schedule described in the preceding paragraph. It, too, passed 500 hours successfully.

The grease of Example 1 was further subjected to the following test schedule. The grease was first statically irradiated to $2.5 \times 10^8$ rads at a rate of $4.95 \times 10^5$ rads per hour (cobalt 60 gammas). It was then subjected to the CRC L-35 test at 250° F. After a further 1940 hours' radiation time at $2.85 \times 10^5$ rads per hour, and 1220 hours' running time, the grease had accumulated $8 \times 10^8$ rads, and the bearing was still running successfully.

Static Tests

The grease of Example 1 was statically irradiated to several levels of radiation as shown in Table I below. The grease samples were tested in a ball bearing test under the following conditions:

204–S17 ball bearing (Marlin Rockwell)
10,000 r.p.m.
350° F.
Continuous running
6 lbs. radial load.

TABLE I

|  | Hours To Failure | | | |
| --- | --- | --- | --- | --- |
|  | Non Irradiated | $1 \times 10^8$ Rads | $2.2 \times 10^8$ Rads | $3 \times 10^9$ Rads |
| Static Irradiation Followed by Test | 500+ | 504 | 307 | 159 |

Results set out above indicate that: (1) the grease is capable of lubricating a bearing under the stated conditions for a substantial period of time, even after the most extreme radiation dosage shown; and (2) that the result at $2.2 \times 10^8$ rads is lower than the comparable dynamic test given above for the same grease. It is considered that temperature during irradiation is largely responsible for this difference.

In the grease compositions contemplated herein, the complex salts or complex salt-soap gelling agents are used in quantities from about 5 to about 30 percent by weight, and preferably from about 10 to about 20 percent by weight.

As indicated above, the new lubricants can be used for a wide range of industrial applications in which atomic radiation is present. Typical applications are for lubricaton of the machinery, mechanisms and vehicles mentioned above.

I claim:
1. A grease resistant to atomic and high energy radiation, comprising: a major proportion of an aromatic fluid of lubricating viscosity selected from the group consisting of aromatic hydrocarbons and aromatic ethers and from about 5 to about 30 percent by weight of a grease-gelling alkaline earth metal salt complex free of aromatic substituents.

2. A grease resistant to atomic and high energy radiation, comprising: a major proportion of an aromatic fluid of lubricating viscosity selected from the group consisting of aromatic hydrocarbons and aromatic ethers and from about 5 to about 30 percent by weight of complex alkaline earth metal salt-alkaline earth metal soap gelling agent free of aromatic substituents.

3. A grease as defined by claim 2 wherein the gelling agent is a complex alkaline earth metal salt-alkaline earth metal soap gelling agent of an alkaline earth metal, a low molecular weight aliphatic carboxylic acid having from one to six carbon atoms per molecule, and a high molecular weight aliphatic carboxylic acid having more than twelve carbon atoms per mole.

4. A grease as defined by claim 2 wherein the gelling agent is a complex alkaline earth metal salt-alkaline earth metal soap gelling agent of an alkaline earth metal, a low molecular weight aliphatic carboxylic acid having from one to six carbon atoms per molecule, an intermediate molecular weight aliphatic carboxylic acid having from seven to twelve carbon atoms per molecule and a high molecular weight aliphatic carboxylic acid having more than twelve carbon atoms per molecule.

5. A grease as defined by claim 2 wherein the gelling agent is a complex alkaline earth metal salt-alkaline earth metal soap gelling agent of an alkaline earth metal, a low molecular weight aliphatic carboxylic acid having from one to six carbon atoms per molecule, an intermediate molecular weight aliphatic carboxylic acid having from seven to twelve carbon atoms per molecule, a high molecular weight aliphatic carboxylic acid having more than twelve carbon atoms per molecule, and nut oil acids comprising mixtures of acids containing from about 8 to 18 carbon atoms per molecule and predominating in $C_{12}$–$C_{14}$ acids.

6. A grease as defined by claim 2 wherein the gelling agent is a complex alkaline earth metal salt-alkaline earth metal soap gelling agent of an alkaline earth metal, a low molecular weight aliphatic carboxylic acid having from one to six carbon atoms per molecule and an intermediate molecular weight aliphatic carboxylic acid having from seven to twelve carbon atoms per molecule.

7. A grease as defined by claim 2 wherein the alkaline earth metal is calcium.

8. A grease as defined by claim 2 wherein the aromatic fluid is a polyalkylphenyl ether.

9. A grease as defined by claim 2 wherein the aromatic fluid is a dodecyl diphenyl ether.

10. A grease as defined by claim 2 wherein the aromatic fluid is a butylated-bis(p-phenoxyphenyl) ether.

11. A grease resistant to atomic and high energy radiation, comprising: a major proportion of a dodecyl diphenyl ether and from about 5 to about 30 percent by weight of a complex metal salt-metal soap gelling agent of calcium, acetic acid, caprylic acid and stearic acid, the molar ratio of said acetic acid to the total of said caprylic and stearic acids being about 3.5:1, and the molar ratio of said stearic acid to said caprylic acid being about 0.13:1.

12. A grease resistance to atomic and high energy radiation, comprising: a major proportion of an aromatic fluid of lubricating viscosity comprising equal parts by weight of a dodecyl diphenyl ether and a butylated bis-(p-phenoxyphenyl) ether, and from about 5 to about 30 percent by weight of a complex metal salt-metal soap gelling agent of calcium, acetic acid, caprylic acid, and oleic acid, the molar ratio of said acetic acid to the total of said caprylic and oleic acids being about 14:1 and the molar ratio of said oleic acid to said caprylic acid being about 0.6:1.

13. A method of operating machinery that is exposed to atomic radiation, which comprises applying to the relatively moving parts of said machinery a grease comprising a major proportion of an aromatic fluid of lubricating viscosity selected from the group consisting of aromatic hydrocarbons and aromatic ethers and from about 5 to about 30 percent by weight of a grease-gelling alkaline earth metal salt complex free of aromatic substituents.

14. A lubricant resistant to atomic and high energy radiation, comprising: a major proportion of an aromatic fluid of lubricating viscosity selected from the group consisting of aromatic hydrocarbons and aromatic ethers and from about 5 to about 30 percent by weight a complex alkaline earth metal salt-alkaline earth metal soap free of aromatic substituents.

15. A grease resistant to atomic and high energy radiation, comprising: a major proportion of an aromatic fluid of lubricating viscosity selected from the group consisting of aromatic hydrocarbons and aromatic ethers and from about 10 to about 20 percent by weight of a grease-gelling alkaline earth metal salt complex free of aromatic substituents.

16. A method of operating machinery that is exposed to atomic radiation, which comprises applying to the relatively moving parts of said machinery a grease comprising a major proportion of an aromatic fluid of lubricating viscosity selected from the group consisting of aromatic hydrocarbons and aromatic ethers and from about 10 to about 20 percent by weight of a grease-gelling alkaline earth metal salt complex free of aromatic substituents.

17. A lubricant resistant to atomic and high energy radiation, comprising: a major proportion of an aromatic fluid of lubricating viscosity selected from the group consisting of aromatic hydrocarbons and aromatic ethers and from about 10 to about 20 percent by weight of a complex alkaline earth metal salt-alkaline earth metal soap free of aromatic substituents.

(References on following page)

References Cited in the file of this patent

UNITED STATES PATENTS

| | | |
|---|---|---|
| 2,844,536 | Morway | July 22, 1958 |
| 2,892,777 | Morway | June 30, 1959 |
| 2,940,932 | Morway | June 14, 1960 |
| 2,976,242 | Morway | Mar. 21, 1961 |

OTHER REFERENCES

Nuclear Science Abstracts, vol. 13, #2, January 31, 1959.

Abstract #925 (cites NP-7007. Development of Prototype Nuclear Production Resistant Engine Oil Progress Report for June–August 1958, Mahoney et al.).